United States Patent [19]

Pacozzi

[11] 4,065,769

[45] Dec. 27, 1977

[54] METHOD FOR CHECKING TRANSMITTER-RECEIVER REVERSING SWITCHES IN PULSE-DOPPLER RADAR DEVICES

[75] Inventor: Pierino Pacozzi, Zurich, Switzerland

[73] Assignee: Siemens-Albis Aktiengesellschaft, Zurich, Switzerland

[21] Appl. No.: 706,918

[22] Filed: July 19, 1976

[30] Foreign Application Priority Data

Aug. 22, 1975 Switzerland .................. 10893/75

[51] Int. Cl.² .................. G01R 27/00; G01S 7/40
[52] U.S. Cl. .................. 343/17.7; 324/58 R
[58] Field of Search .................. 343/17.7; 324/58 R

[56] References Cited

U.S. PATENT DOCUMENTS

| 2,549,131 | 4/1951 | Rideout | 343/17.7 |
|---|---|---|---|
| 2,836,813 | 5/1958 | Flower et al. | 343/17.7 |
| 2,997,709 | 8/1961 | Mumford | 343/17.7 X |
| 3,048,838 | 8/1962 | Bretscher | 343/17.7 |
| 3,221,328 | 11/1965 | Isch | 343/17.7 X |
| 3,883,870 | 5/1975 | Kunz | 343/17.7 |

OTHER PUBLICATIONS

"Microwave Duplexers", by Smullin & Montgomery, MIT Radiation Laboratory Series, No. 14, McGraw-Hill Book Co., 1948, pp. 400-430.

Primary Examiner—Malcolm F. Hubler
Attorney, Agent, or Firm—Werner W. Kleeman

[57] ABSTRACT

A method of checking or testing the functionality of transmitter-receiver reversing switches of pulse Doppler-radar installations for protecting the microwave-receiver component, testing being accomplished by means of a microwave-test signal supplied to the microwave-receiver component between the antenna and the transmitter-receiver reversing switches. According to the invention, the Doppler angle error voltages brought about by such microwave-test signal is measured once with and once without the radar transmitter turned-on, there is formed the difference signal between both of the momentarily measured Doppler angle-error voltages, and when there occurs such a difference signal there is concluded that there is present a defective transmitter-receiver reversing switch.

1 Claim, 1 Drawing Figure

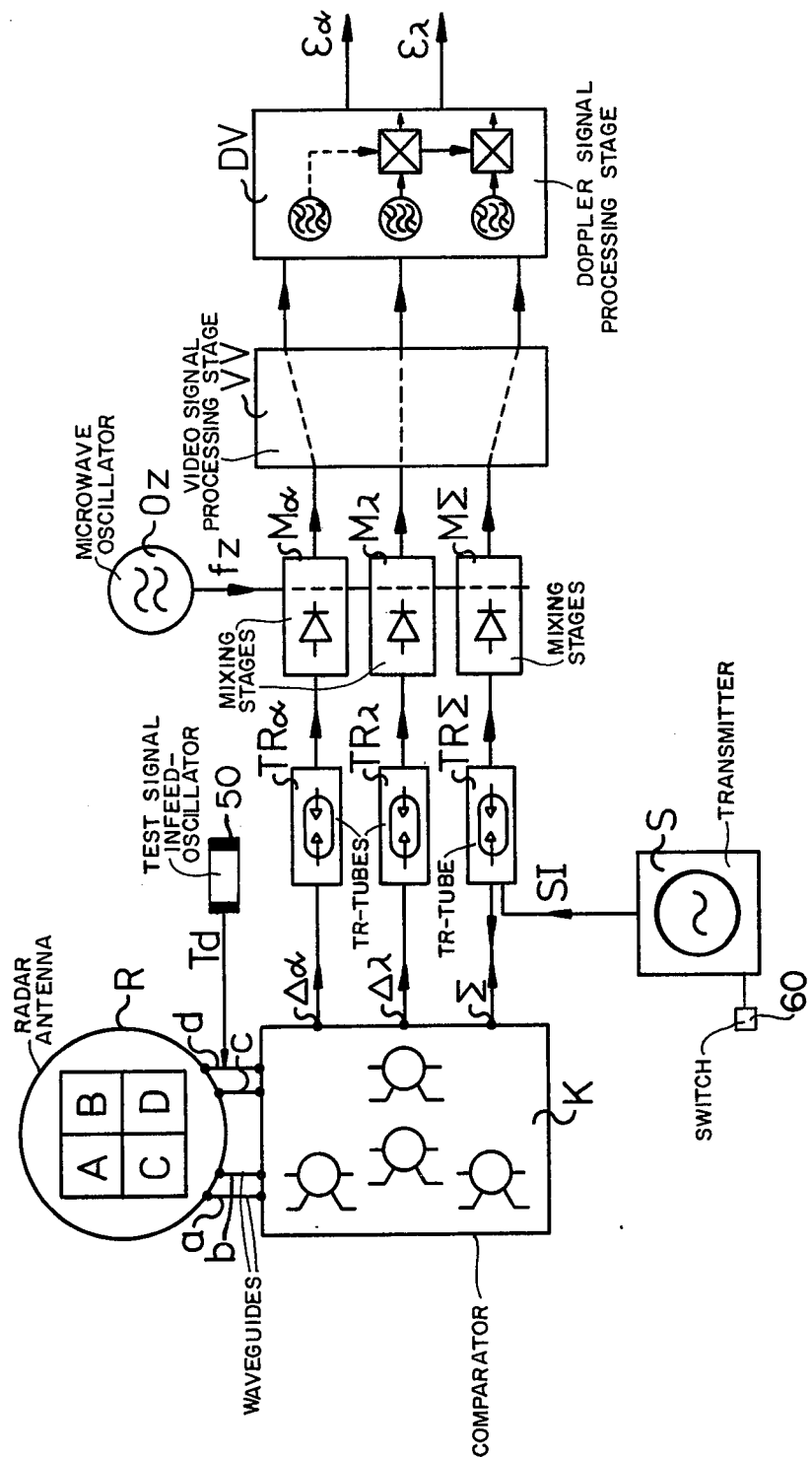

METHOD FOR CHECKING TRANSMITTER-RECEIVER REVERSING SWITCHES IN PULSE-DOPPLER RADAR DEVICES

BACKGROUND OF THE INVENTION

The present invention relates to a new and improved method for checking or testing the functionality of transmitter-receiver reversing switches present in pulse Doppler-radar installations for protecting the microwave-receiver component, by means of a microwave-checking or testing signal which is supplied to the microwave-receiver component between the antenna and the transmitter-receiver reversing switches.

In radar devices having common transmitter- and receiver antenna there are present reversing switches, usually called TR-tubes or ATR-tubes in duplexer, for rapidly switching the antenna between the transmitter and the receiver. Transmitter-receiving reversing switches must simultaneously protect the receiver from the high HF-energy of the transmitter and along the transmitting path as well as also the receiving path should cause only minimum damping losses, time-delays and distortions.

Particularly great requirements are placed upon the transmitter-receiver reversing switches when the pulse-radar devices operate at relatively small target distance. The corresponding short pulse-travel-times require extremely short, reproducible switching times. It is therefore obvious that a need exists to check the functional reliability of such important elements periodically, at least however prior to placing the radar device into operation.

In German patent publication No. 1,075,685 there is disclosed, for instance, a device for the periodic comprehensive total checking of a radar device. Due to a series of measurements, among others, also the receiver sensitivity, it is thus possible to narrow down errors. A defective transmitter-receiver reversing switch can be equally ascertained with the corresponding expenditure of equipment which is there provided.

Basically, transmitter-receiver reversing switches can be differently constructed (cf. M. Skolnik, Radar Handbook, McGraw-Hill, 1970, Chapter 8.6), but all types, by measurement of the relative throughpass damping, allow for determinations regarding their functional state. In the case of, for instance, transmitter-receiver reversing switches (TR-tubes operating according to the glow discharge principle) it is possible, due to the absorption of gas molecules by the electrodes, that reduced gas pressure prevails internally of the TR-tube or tubes. This brings about correspondingly increased regeneration times (deionization of the tubes after each transmitting pulse, and especially in the case of short distance measurements leads to breakdown of the radar device. Such change of the blocking characteristic brought about by the operating time can be still detected in time by measuring the absolute throughpass damping or by comparative measurements (relative throughpass damping) for different signal flow.

SUMMARY OF THE INVENTION

It is a primary object of the present invention to provide an improved method of checking transmitter-receiver reversing switches in pulse-Doppler-radar devices in a manner not associated with the aforementioned drawbacks and limitations of the prior art.

Another and more specific object of this invention aims at providing a method of periodically checking transmitter-receiver reversing switches installed in pulse-Doppler-radar devices in an extremely reliable and efficient manner and with a minimum of expenditure in equipment.

Another object of the invention, and in keeping with the foregoing objectives, is to carry out this checking with simple means used conventionally in the maintenance of radar devices and requiring a minimum amount of time.

Yet a further object is to allow the checking operation to be integrated in a computer-controlled total test program, without thereby requiring considerable modifications of the already existing radar device.

Now in order to implement these and still further objects of the invention, which will become more readily apparent as the description proceeds, the inventive method is manifested by the features that the Doppler angle-error voltages brought about by the microwave-checking or test signal is measured once with and once without the radar transmitter turned-on, there is formed the difference signal between the two momentarily measured Doppler angle-error voltages, and that when there appears such a difference signal there can be concluded that there is present a defective transmitter-receiver reversing switch.

The inventive method solves the stated objectives, allows for a positive judgement as to the functionality of the transmitter-receiver reversing switches, and can be used with any type of transmitter-receiver reversing switch.

BRIEF DESCRIPTION OF THE DRAWING

The invention will be better understood and objects other than those set forth above, will become apparent when consideration is given to the following detailed description thereof. Such description makes reference to the annexed drawing wherein the single drawing illustrates in block circuit diagram an exemplary embodiment of radar installation and with which the method of the invention can be employed.

DETAILED DESCRIPTION OF THE PREFERRED EMBODIMENTS

Describing now the drawing, in the block circuit diagram of the single Figure there has been illustrated in an extensively simplified manner a pulse-Doppler-radar device. The radar antenna R is connected via the waveguides $a$, $b$, $c$ and $d$ with a comparator K. The waveguide $d$ possesses a test or check signal-infeed Td. The comparator K is connected by means of its three output channels $\Delta a$, $\Delta \lambda$ and $\epsilon$ to a respective corresponding TR-tube i.e. the tubes Tr$a$, Tr$\lambda$, TR$\epsilon$ with subsequently connected mixing stages M$a$M$\lambda$, M$\lambda$, M$\epsilon$ respectively. Connected thereafter are a respective video signal-processing stage VV common to all of the channels and a Doppler signal-processing stage DV. The Doppler signal-processing stage DV delivers information at its output regarding the azimuth E$a$ and elevational angle E$\lambda$. In the transmitter-receiver reversing switch TRE there are infed the transmitter-pulses SI delivered by the transmitter S. In the mixing stages M$a$, M$\lambda$ and M$\epsilon$ there is supplied a signal $fz$ generated by a microwave oscillator Oz.

The function of a pulse-Doppler-radar receiver is known; equally its circuit arrangement with regard to the total radar installation.

A microwave signal emanating for instance from a test-oscillator 50 is delivered with constant amplitude and frequency to the test signal-infeed T$d$. In accordance with the known mode of operation of the comparator K the microwave signal appears at all of the three output channels $\Delta\alpha$, $\Delta\lambda$ and $\epsilon$ and is further transmitted via the transmitter-receiver reversing switches TR$\alpha$, TR$\lambda$, TR$\epsilon$ to the mixing stages M$\alpha$, M$\lambda$, M$\epsilon$. The mixing stages M$\alpha$, M$\lambda$, M$\epsilon$ set the microwave signal in conventional manner at an intermediate frequency and process, according to the system, the microwave signal which is obtained in this manner in the subsequent video signal-processing stage VV and the Doppler signal-processing stage DV. Accordingly, there appear at the outputs azimuth angle information $\epsilon\alpha$ and elevational angle information $\epsilon\lambda$, so-called error voltages of constant amplitude which can be conventionally read at the radar device, for instance at the viewing device or display unit.

Now if the radar transmitters is turned-on by means of the switch 60, then with ideal operating transmitter-receiver reversing switches there does not occur any change of the error voltages. Depending upon the nature of the transmitter-receiver reversing switches as well as in accordance with their functional state there is realized, however, a more or less great transmitter signal effect upon the total receiver and brings about a corresponding change of the error voltages.

Due to the first measurement with the transmitter signal turned-on and a second measurement without the transmitter signal there can be determined a relative throughpass damping. The accuracy of the method is primarily governed by the employed measuring means. Relative damping losses of about 1 db can be already positively determined with conventional measuring means; therefore there is obtained a sufficiently exact criterion for a routine checking or testing of the transmitter-receiver reversing switches.

This type of testing or checking, apart from the already mentioned advantages, has the benefit that measurement can be accomplished at operating conditions and nonetheless prevents, by comparison of the error voltage after the Doppler signal processing DV, a disturbance of the checking by so-called fixed signs. The described test therefore can be carried out in the case of radar antennas directed directly at a non-moving target or also with only partial radiation of a stationary target by the lateral lobes of the antenna characteristic.

In the case of radar devices, which additionally possess angle error-evaluation channels, which operate at different times after the transmitting pulse, a relative comparison of two error voltages measured at different times after an individual transmitting pulse can be evaluated for determining the regeneration capability of the TR-tubes.

While there are shown and described present preferred embodiments of the invention, it is to be distinctly understood that the invention is not limited thereto, but may be otherwise variously embodied and practiced within the scope of the following claims.

What is claimed is:

1. A method of testing the functionality of the transmitter-receiver reversing switches of pulse-Doppler-radar installations used in pulse-Doppler-radar devices operating according to the monopulse-summation-difference principle, by measuring the relative throughpass damping, and wherein the transmitter-receiver reversing switches serve for the protection of receiver components during the supply of the transmitter line in the waveguide system, which method comprises the steps of:

delivering a microwave-test signal to the receiver system between the antenna and a subsequently connected comparator;

obtaining with the radar transmitter turned-on angle error voltage outputs in the form of a first azimuth angle error-voltage value and a first elevational angle-error voltage value;

obtaining a second azimuth angle-error voltage value and a second elevational angle-error voltage value with the radar transmitter turned-off; and employing the presence of a difference between at least any one of the measured first azimuth angle-error voltage value and the measured second azmimuth angle-error voltage value, or between the measured first elevational angle-error voltage value and the measured second elevational angle-error voltage value, to indicate the presence of a defective transmitter-receiver reversing switch.

* * * * *